United States Patent [19]

Bryant et al.

[11] Patent Number: 4,984,940
[45] Date of Patent: Jan. 15, 1991

[54] MULTILAYER COATED CEMENTED CARBIDE CUTTING INSERT

[75] Inventors: William A. Bryant, McKeesport; George P. Grab, Greensburg, both of Pa.

[73] Assignee: Kennametal Inc., Latrobe, Pa.

[21] Appl. No.: 461,712

[22] Filed: Jan. 8, 1990

Related U.S. Application Data

[63] Continuation of Ser. No. 324,847, Mar. 17, 1989, abandoned.

[51] Int. Cl.$^5$ .............................................. B23B 27/14
[52] U.S. Cl. ...................................... 407/119; 51/295; 51/309; 427/249; 428/698
[58] Field of Search ..................... 407/113, 119, 120; 51/293, 295, 307, 309; 427/214, 215, 249, 253, 228; 501/87, 89, 92, 93; 428/698, 701

[56] References Cited

U.S. PATENT DOCUMENTS

| Re. 31,526 | 2/1984 | Smith et al. | 427/253 |
|---|---|---|---|
| 4,441,894 | 4/1984 | Sarin et al. | 427/249 |
| 4,449,989 | 5/1984 | Sarin et al. | 427/249 |
| 4,670,024 | 6/1987 | Bhat et al. | 51/295 |
| 4,776,863 | 10/1988 | van den Berg et al. | 428/698 |
| 4,830,886 | 5/1989 | Cho et al. | 427/249 |
| 4,842,937 | 6/1989 | Meyer et al. | 428/698 |
| 4,843,039 | 6/1989 | Akesson et al. | 428/698 |

FOREIGN PATENT DOCUMENTS 2048960 4/1979 United Kingdom .

OTHER PUBLICATIONS

Schintlmeister et al., "Cutting Tool Materials Coated by Vapour Deposition," Wear 100 (1984), pp. 153-169.
Dreyer et al., "Development and Tool Life Behavior of Super-Wear-Resistant Multilayer Coatings on Harometals," Metals Society (Book 278), London, England (1982), pp. 112-117.

Primary Examiner—Frederick R. Schmidt
Assistant Examiner—Blynn Shideler
Attorney, Agent, or Firm—John J. Prizzi; Larry R. Meenan

[57] ABSTRACT

An indexable metalcutting insert is provided having a cobalt cemented tungsten carbide substrate with a multilayer refractory coating thereon. The substrate has a cobalt content of 6.1 to 6.5 weight percent and is characterized by a hardness of 90.8 to 91.6 Rockwell A and a magnetic coercive force of 110 to 180 oerstads. The coating contains at least a plurality of alumina layers which are separated from and bonded to each other by a group IVB metal nitride, such as titanium nitride, and which are bonded to the substrate by a backing layer of 5 to 8 $\mu$ in thickness, composed of a carbide and/or carbonitride of titanium, zirconium and/or hafnium.

13 Claims, 3 Drawing Sheets

MULTILAYER COATED CEMENTED CARBIDE CUTTING INSERT

This is a continuation of copending application Ser. No. 07/324,847 filed on Mar. 17, 1989 now abandoned.

BACKGROUND OF THE INVENTION

The present invention relates to coated cemented carbide metalcutting inserts, especially those of the indexable type.

The primary benefit of various coating materials to the metalcutting performance of coated indexable cobalt cemented tungsten carbide inserts has been well documented. Abrasion resistance (the most important consideration at lower cutting speeds) is provided by titanium carbide (or titanium carbonitride). Resistance to tool-workpiece chemical interaction (crater formation) is provided most commonly by alumina due to this material having a very low free energy of formation. Titanium nitride is reputed to lower tool-workpiece frictional forces and the occurrence of edge build-up. In addition, its lustrous gold color enhances the marketability of the coated tool and allows tool wear to be more readily observed.

The combined benefits of these materials have been used to advantage in first generation multilayer coated tool inserts. Examples include the coating systems titanium carbide/titanium carbonitride/titanium nitride and titanium carbide/alumina/titanium nitride. Additional benefits are expected for second generation multilayer coatings designed to achieve improved performance through optimization of layer thickness, number of layers and the sequence of layer deposition.

The advantages of reduced grain size in chemical vapor deposition (CVD) coatings applied to indexable cobalt cemented tungsten carbide inserts are well known. The most commonly utilized method of reducing grain size in alumina layers is to periodically interrupt the deposition of the alumina layer by depositing a thin layer of titanium carbide, titanium carbonitride or titanium nitride between the alumina layers. In this way, each succeeding alumina layer renucleates and grain growth is minimized. The advantages of this procedure were demonstrated by Dreyer and Kolaska ("Development and Tool Life Behavior of Super-Wear-Resistant Multilayer Coatings on Hardmetals," Metals Society (Book 278), London, England (1982), pages 112–117).

Considerable improvements in flank wear resistance have been observed when cutting hot-worked steel (54 HRC), chilled cast iron and Inconel 718 with commercially available multilayered alumina coated indexable inserts. These inserts utilized a ten layer coating consisting of titanium carbide, titanium carbonitride, titanium nitride and four layers of alumina separated by three layers of titanium nitride (Schintelmeister et al, "Cutting Tool Materials Coated by Chemical Vapor Deposition," Wear, 100 (1984), pages 153–169).

Improvements in both flank and crater wear performance have been demonstrated for a multilayer alumina coated insert with an initial 3 micrometer ($\mu$) thick layer of titanium carbide overlaid by 19 layers of titanium nitride and 19 layers of alumina to a total thickness of 6 $\mu$. When machine tested against conventional 6 $\mu$ thick titanium carbide coated and 5 $\mu$/1 $\mu$ thick titanium carbide/alumina coated inserts, the alumina multilayered insert demonstrated superior crater and flank wear resistance in the machining of C60 steel. Superior performance of this alumina multilayered coating was also observed during interrupted cutting of CK 45 KN steel (Dreyer et al, United Kingdom Patent Application No. GB 2048960A).

Applicants have now surprisingly discovered a multilayered coated cemented carbide cutting insert possessing an excellent combination of edge strength, deformation resistance, crater resistance and flank wear resistance, which make it commercially competitive in a wide range of metalcutting applications such as continuous and interrupted machining of carbon and alloy steels and gray and ductile cast irons.

BRIEF SUMMARY OF THE INVENTION

A cutting insert is provided having a body with a rake face and a flank face, at whose junction is a cutting edge. Preferably, the cutting insert is of the indexable type, having more than one cutting edge. This body is composed of a cemented carbide substrate having a coating bonded thereto. In accordance with the present invention, the cemented carbide substrate consists essentially of: (1) tungsten carbide grains; (2) solid solution carbide grains containing tungsten and an element selected from the group consisting of titanium, hafnium, zirconium, tantalum and niobium; and (3) 6.1 to 6.5 weight percent (w/o) cobalt.

The substrate is characterized by a hardness of 90.8 to 91.6 Rockwell A and a magnetic coercive force of 110 to 180 oerstads.

Preferably, tungsten carbide forms at least 80 w/o of the substrate, and more preferably, at least 85 w/o of said substrate. Cobalt preferably is present at about 6.2 to 6.4 w/o of said substrate. Preferably, titanium, niobium and tantalum are present at 1.7 to 2.3, 1.2 to 1.8 and 3.2 to 3.8 w/o of the substrate, respectively. Preferably, the hardness of the substrate is 91.0 to 91.6 Rockwell A and the magnetic coercive force is, preferably, 120 to 160 oerstads.

The coating in accordance with the present invention consists of three layers, a backing layer bonded to the substrate, an active layer bonded to the backing layer and a finish layer bonded to the active layer. The backing layer has a thickness of at least 5.0 micrometers ($\mu$) and contains one or more layers selected from the group of carbides and carbonitrides of titanium, hafnium and zirconium, alone or in combination with each other. Preferably, the backing layer is titanium carbonitride of either uniform or varying stoichiometry. The backing layer may also optionally contain a titanium carbide layer, preferably bonded directly to the carbide substrate.

The active layer contains alternating sublayers of alumina and a nitride layer selected from the group of nitrides of titanium, zirconium and hafnium, alone or in combination. There are at least two layers of alumina separated by the nitride layer. The active layer may start with either an alumina or nitride layer bonded directly to the backing layer. Preferably, each alumina layer has a nominal thickness of less than about 1.5 $\mu$ and, more preferably, 0.5 to 1.0 $\mu$, to assure that the average alumina grain size is between about 0.15 to 0.5 $\mu$ and, therefore, of high hardness and excellent crater resistance. Each alumina sublayer is separated from and bonded to the next alumina sublayer by a nitride sublayer, preferably titanium nitride, having a preferred thickness of about 1.0 $\mu$ or less and, more preferably, of about 0.2 to less than 1.0 $\mu$.

The finish layer is bonded to the outermost alumina sublayer in the active layer and has one or more sublayers selected from the group of the carbonitrides and nitrides of titanium, hafnium and zirconium, alone or in combination. Preferably, the finish layer is formed of titanium nitride having a total thickness of 0.2 to 4 μ.

In an alternative preferred embodiment, the finish layer is composed of two sublayers, an inner sublayer of titanium carbonitride bonded to the last alumina sublayer, and then an outermost layer of titanium nitride. In this last embodiment, the titanium carbonitride sublayer has a preferred thickness of about 0.2 to 1.0 μ and the titanium nitride sublayer has a preferred thickness of about 0.3 to 3.0 μ, and more preferably, 0.3 to 2.0 μ.

These and other aspects of the present invention will become more apparent upon review of the following detailed description of the invention in conjunction with the drawings which are briefly described below:

DETAILED DESCRIPTION OF THE INVENTION

Figure 1:
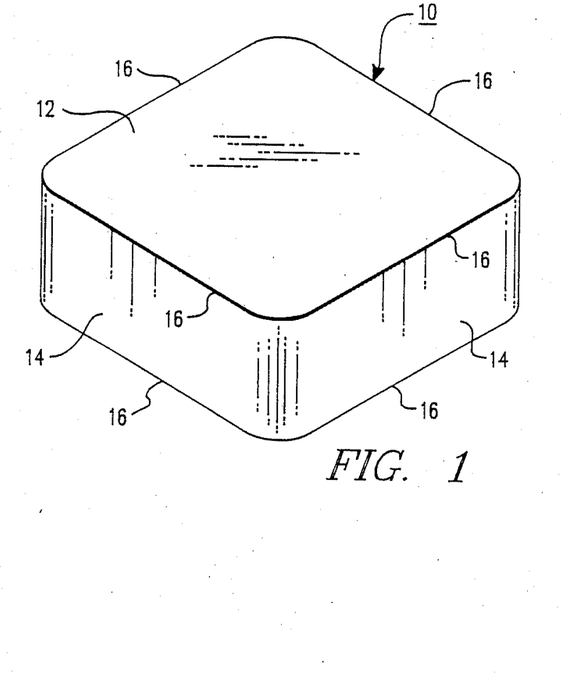
FIG. 1 shows an isometric view of an embodiment of a cutting insert in accordance with the present invention.

In accordance with the present invention, a multilayered cemented carbide metalcutting insert 10 is provided as shown in FIG. 1. The cutting insert 10 is preferably of the indexable and invertable type having a body in which a rake face 12 and a flank face 14 join to form a cutting edge 16.

Figure 2:
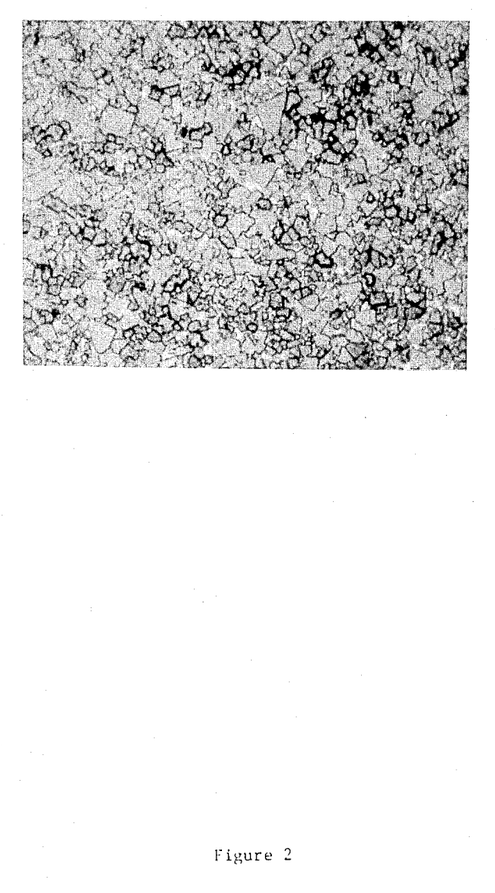
FIG. 2 shows a typical microstructure of a substrate in accordance with the present invention (at 1500x magnification).
Figure 3:
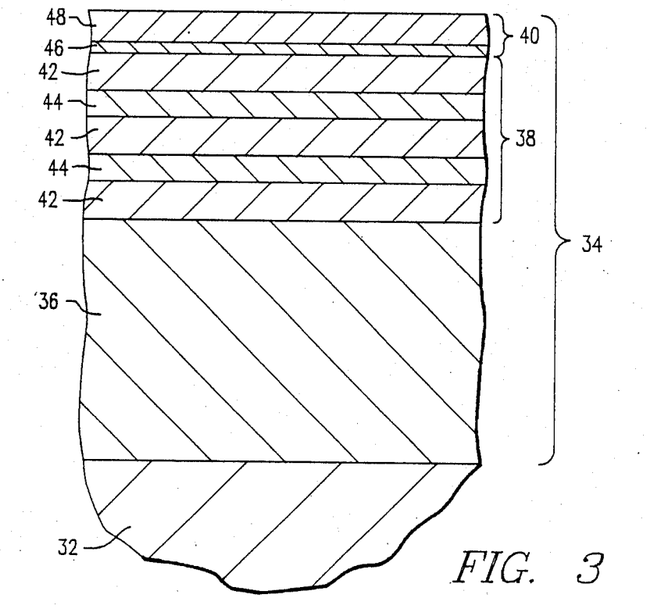
FIG. 3 shows a cross section through a preferred embodiment of the coating in accordance with the present invention.

As shown in FIGS. 2 and 3, the body is composed of a cemented carbide substrate 32 having a coating 34 bonded thereto. As shown in the photomicrograph (FIG. 2) the cemented carbide substrate consists essentially of tungsten carbide grains (light gray phase), solid solution carbide grains (darker gray phase) containing tungsten and one or more elements selected from the group of titanium, 5 hafnium, zirconium, tantalum and niobium, and 6.1 to 6.5 w/o cobalt (white phase). The substrate is characterized by a hardness of 90.8 to 91.6 Rockwell A and a magnetic coercive force of 110 to 180 oerstads.

Preferably, the cobalt content of the cemented carbide substrate is 6.2 to about 6.4 w/o. It is applicants' belief that, at this combination of cobalt content and tungsten carbide grain size (or binder phase thickness, as measured by magnetic coercive force) and hardness, preferably 91 to 91.6, the substrate possesses a unique combination of deformation resistance and toughness (or edge strength) which in combination with the coating according to the present invention significantly contribute to its unique metalcutting abilities. Preferably, the magnetic coercive force is about 120 to 160 oerstads.

Preferably, titanium, tantalum and niobium are also present as solid solution carbides. Titanium is added for grain size control and deformation resistance, while tantalum and/or niobium are added for thermal shock resistance. In a more preferred composition in accordance with the present invention, the substrate contains about 1.7 to 2.3 w/o titanium and 4.4 to 5.6 w/o total of tantalum and niobium, with 3.2 to 3.8 w/o tantalum and 1.2 to 1.8 niobium being most preferred.

Preferably, the substrate has a magnetic saturation of greater than 88 percent (more preferably, 88 to 98 percent) and, preferably, contains only A or, at worst, A and B type porosity.

The tungsten carbide content of the substrate is, preferably, at least 80 w/o and, more preferably, at least 85 w/o.

The coating in accordance with the present invention (see FIG. 3) consists of three main layers or sections, a backing layer 36 bonded to the substrate 32, an active layer 38 bonded to the backing layer 36, and a finish layer 40 bonded to the active layer 38.

The backing layer 36 is formed of one or more layers or sublayers selected from the group of carbides and carbonitrides of titanium, hafnium, zirconium, alone or in combination with each other. Preferably, the backing layer is composed of carbides and/or carbonitrides of titanium only. It has been found to be most preferable that the backing layer be made of a single layer of titanium carbonitride, and that the backing layer has a thickness of about 5 to 8 μ, preferably 5.5 to 7.5 μ, and more preferably, about 5.5 to 7.0 μ. It has been found that resistance to flank wear is proportional to the thickness of the backing layer. The titanium carbonitride backing layer may be of a single chemistry or it may be graded, i.e., have a carbon to nitrogen ratio that varies through its thickness, e.g., carbon decreasing in a direction away from the substrate.

The active layer 38 contains alternating sublayers of alumina 42 and a nitride 44 selected from the group of nitrides of titanium, zirconium and hafnium, alone or in combination. The active layer may start with an alumina or nitride sublayer bonded directly to the backing layer. In order to obtain high hardness alumina sublayers having enhanced crater wear resistance, each alumina layer should have a fine grain size, preferably with a median grain size in the range of about 0.15 to 0.5 μ. This fine grain size is obtained by keeping the thickness of each alumina layer to less than about 1.5 μ and, more preferably, about 0.5 to about 1.0 μ. In order to maximize crater resistance, at least two, and preferably at least three or four, alumina sublayers 42 of the type described above are provided. Each alumina sublayer is separated from the next by a nitride sublayer, which is preferably titanium nitride. This nitride sublayer not only separates the alumina sublayers, allowing the cumulative thickness of fine grained, crater resistant alumina, to be increased, but it also serves to adherently bond one alumina sublayer to the next. Tests performed by applicants indicate that titanium nitride sublayers provide significantly better adherence to the alumina sublayers than either titanium carbide or titanium carbonitride. The thickness of each nitride sublayer 44 should be at least about 0.2 μ to assure complete coverage of the underlying alumina sublayer, but no more than about 1.0 μ, since there is no advantage to increased thickness. The active layer preferably has a total thickness of 3 to 8 μ and, more preferably, 3 to 5.5 μ.

Bonded to the last alumina sublayer 42 in the active layer 38 is a finish layer 40. The finish layer is designed to provide a low friction surface to the coating 34 and to minimize metal build-up on the coating during metalcutting operations.

The finish layer 40 contains one or more layers or sublayers selected from the group of the carbonitrides and nitrides of titanium, hafnium and zirconium, alone or in combination. Preferably, the finish layer is formed of titanium nitride having a thickness of 0.2 to 4 μ. In the alternative preferred embodiment shown in FIG. 3, the finish layer 40 is composed of two sublayers, an inner sublayer 46 of titanium carbonitride bonded to the last alumina sublayer 42, and then an outermost sublayer 48 of titanium nitride bonded to the titanium carbonitride sublayer 46. In this last embodiment, the titanium carbonitride sublayer has a preferred thickness of about 0.2 to 1.0 μ and the titanium nitride sublayer has a preferred thickness of about 0.3 to 3.0 μ and, more preferably, 0.3 to 2.0 μ.

As coating thickness increases, residual stresses build up in the coatings, which can reduce the strength or integrity of the coatings and lead to reductions in metal-cutting performance. Therefore, the coating 34 total thickness is in the range of 7.5 to 20 μ, with about 8 to 15 being preferred and about 9 to 12.5 μ being more preferred.

The coating described above may be applied by conventional chemical vapor deposition processes well known to those of ordinary skill in the art in the metal-cutting insert field. The nitride coatings described above may also be applied by physical vapor deposition (PVD) techniques, also well known to those of ordinary skill in the art. For example, in the coatings described herein, it is contemplated that all coating layers may be applied by automated CVD techniques. Alternatively, for example, the titanium nitride layer in the finish layer may be applied by PVD techniques.

The present invention will become more clear upon review of the following examples which are meant to be only illustrative of the present invention.

The charge materials shown in Table 1 were milled in a 7.125 inch × 15 inch mill jar with 45,000 grams of cemented tungsten carbide cycloids and heptane for 19 hours to produce a Fisher SubSieve Size (FSSS) (ASTM 330-82) apparent particle size of 1.2μ. The milled slurry was then poured through a 400 mesh sieve into a sigma dryer. Liquid paraffin and ethomeen levels of 2 percent and 0.25 percent, respectively, were then added and the slurry was then mixed and dried in the sigma blender. The resulting mixture was then Fitz-milled through a 0.040 inch screen.

Inserts were then pill pressed and sintered to full density at 2650° F. for 30 minutes under about a

|  | Coating Structure | | |
|---|---|---|---|
|  | 3 | 4 | 5 |
| Backing Layer | 2.5μ TiC<br>2.5μ TiCN | 5.0μ TiCN | 2.5μ TiC<br>2.5μ TiCN |
| Active Layer | 1μ Al₂O₃ | 1μ Al₂O₃ | 1μ Al₂O₃<br>0.5μ TiN |
|  | 0.5μ TiN | 0.5μ TiN | 1.0μ Al₂O₃<br>0.5μ TiN |
|  | 1.0μ Al₂O₃<br>0.5μ TiN | 1.0μ Al₂O₃<br>0.5μ TiN | 1.0μ Al₂O₃<br>0.5μ TiN<br>1.0μ Al₂O₃ |
|  | 1.0μ Al₂O₃ | 1.0μ Al₂O₃ |  |
| Finish Layer | 0.5-1.0 TiN | 0.5-1.0 TiN | 0.5-1.0 TiN |

The batch 1 cutting inserts having the coating styles 3-5 were then subjected to the following tests (Tables 4-13):

TABLE 4

| Tool Material | Tool Life & Failure Mode | | | Avg. |
|---|---|---|---|---|
| Coating 3 | 6.8 cr | 7.2 mw* | 5.5 cr | 6.5 |
| Coating 4 | 7.0 mw | 6.8 mw | 7.2 cr | 7.0 |
| Coating 5 | 7.0 mw | 5.0 ch* | 7.5 fw | 6.5 |

*NOTE: Flaking of the coating was noted.
Turning AISI 1045 steel (200 BHN)
700 sfm / .023 ipr / .080" doc
CNMG-432 style (.001-.002 inch radius hone)
−5° lead angle / no coolant
Tool Life Criteria:
fw—.015" uniform flank wear
mw—.030" maximum localized flank wear
cr—.004" crater wear
ch—.030 chip
bk—breakage

TABLE 5

| Tool Material | Tool Life & Failure Mode | | | Av. |
|---|---|---|---|---|
| Coating 3 | 7.4 fw | 5.6 mw* | 6.6 mw* | 6.5 |
| Coating 4 | 12.4 ms | 14.6 mw | 13.0 mw | 13.3 |
| Coating 5 | 9.1 fw | 12.2 mw | 10.2 mw | 10.5 |

*NOTE: Flaking of the coating was noted.
Turning 1045 steel (200 BHN)
850 sfm / .015 ipr / .080" doc
CNMG-432 style (.001-.002 inch radius hone)
−5° lead angle / no coolant
Tool Life Criteria: same as Table 4

TABLE 6

| Tool Material | Tool Life & Failure Mode | | | Avg. |
|---|---|---|---|---|
| Coating 4 | 19.6 cr | 17.7 cr* | 18.4 cr | 18.6 |

*NOTE: Flaking of the coating was noted.
Turning 1045 steel (200 BHN)
850 sfm / .015 ipr / .080" doc
SNGN-433 style (.001-.003 inch radius hone)
15° lead angle / no coolant
Tool Life Criteria: same as Table 4

TABLE 7

| Tool Material | Tool Life & Failure Mode | | Avg. |
|---|---|---|---|
| Coating 4 | 5.8 fw | 5.8 fw | 5.8 |

Turning ASTM A536 80-55-06 ductile iron (248 BHN)
600 sfm / .020 ipr / .100" doc
SNGN-433 style (.001-.003 inch waterfall hone)
15° lead angle / no coolant
Tool Life Criteria: same as Table 4

TABLE 8

| Tool Material | Tool Life & Failure Mode | | Avg. |
|---|---|---|---|
| Coating 3 | 13.2 fw | 14.8 fw | 14.0 |
| Coating 4 | 17.0 fw | 15.7 cr | 16.4 |
| Coating 5 | 14.0 fw | 12.8 fw | 13.4 |

Turning ASTM 536 65-45-12 ductile iron (163 BHN)
850 sfm / .020 ipr / .100" doc
SNGN-433 style (.001-.003 inch waterfall hone)
15° lead angle / no coolant
Tool Life Criteria: same as Table 4

TABLE 9

| Tool Material | Tool Life & Failure Mode | | | Avg. |
|---|---|---|---|---|
| Coating 4 | 17.5 cr | 3.0 ch | 13.3 cr | 11.3 |

Turning ASTM A536 65-45-12 ductile iron (163 BHN)
850 sfm / .020 ipr / .100" doc
SNGN-433 style (.001-.003 inch waterfall hone)
15° lead angle / no coolant
Tool Life Criteria: same as Table 4

TABLE 10

| Tool Material | Tool Life & Failure Mode |
|---|---|
| Coating 4 | 20.6 cr |

Turning ASTM A536 65-45-12 ductile iron (163 BHN)
700 sfm / .030 ipr / .100" doc
SNGN-433 style (.001-.003 inch waterfall hone)
15° lead angle / no coolant
Tool Life Criteria: same as Table 4

TABLE 11

| Tool Material | Tool Life & Failure Mode | | Avg. |
|---|---|---|---|
| Coating 4 | 4.3 fw | 4.6 fw | 4.5 |

Flycut Milling ASTM A536-60-40-18 ductile iron
(182 BHN)
700 sfm / .015 ipt / .100" doc
SNGN-433 style (.001-.003 inch waterfall hone) / no coolant
15° lead angle / 8 inch flycutter cutter diameter / 4 inch width / 24 inch length / straddle type
Tool Life Criteria:
fw—.015" uniform flank wear
cr—.004" crater depth
ch—.030" chip
bk—breakage

TABLE 12

| Tool Material | Tool Life & Failure Mode | | Avg. |
|---|---|---|---|
| Coating 4 | 8.6 cr | 7.8 fw | 8.2 |

Flycut Milling ASTM A536 60-40-18 ductile iron
(182 BHN)
700 sfm / .007 ipt / .100" doc
SNGN-433 style (.001-.003 inch waterfall hone) / no coolant
15° lead angle / 8 inch flycutter cutter diameter / 4 inch width / 24 inch length / straddle type
Tool Life Criteria:
fw—.015" uniform flank wear
cr—.004" crater depth
ch—.030" chip
bk—breakage

TABLE 13

| Tool Material | Tool Life & Failure Mode | | Avg. |
|---|---|---|---|
| Coating 4 | 4.4 cr | 5.0 ch | 4.7 |

Flycut Milling ASTM A536 60-40-18 ductile iron
(182 BHN)
1200 sfm / .007 ipt / .100" doc
SNGN-433 style (.001-.003 inch waterfall hone)
15° lead angle / 8 inch flycutter cutter diameter / 4 inch width / 24 inch length / straddle type
Tool Life Criteria:
fw—.015" uniform flank wear
cr—.004" crater depth
ch—.030" chip
bk—breakage It is submitted that the foregoing test results indicate that the cutting inserts according to the present invention possess an excellent combination of flank wear resistance, crater wear resistance and edge strength in the machining of steels providing long tool lives in both continuous and interrupted machining operations. Good tool lives were exhibited in the machining of ductile cast irons.

All documents referred to herein are hereby incorporated by reference.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A cutting insert comprising:
a body having a rake face and a flank face;
a cutting edge at a junction of said rake face and said flank face;
said body composed of:
a cemented carbide substrate consisting essentially of tungsten carbide grains, solid solution carbide grains containing tungsten and an element selected from the group consisting of titanium, tantalum, niobium, zirconium and hafnium, alone or together, and 6.1 to 6.5 weight percent cobalt; said substrate having a hardness of 90.8 to 91.6 Rockwell A and a magnetic coercive force of 110 to 180 oerstads;
a coating bonded to said substrate;
said coating including a backing layer bonded to said substrate, having a thickness of at least $5\mu$, and selected from the group consisting of the carbides, carbonitrides of titanium, hafnium and zirconium, alone or in combination;
an active layer composed of alternating sublayers including at least a plurality of alumina sublayers separated from each other by an intermediate sublayer selected from the group consisting of the nitrides of titanium, zirconium and hafnium, alone or in combination, and said first aluminua sublayer bonded to said second layer;
a finish layer bonded to the outermost alumina layer; said finish layer selected from the group consisting of the carbonitrides and nitrides of titanium, hafnium and zirconium, alone or in combination;
wherein said alumina in said sublayer has an average grain size of between about 0.15 to 0.5 $\mu$.

2. The cutting insert according to claim 1 wherein the hardness of said substrate is 91.0 to 91.6 Rockwell A.

3. The cutting insert according to claim 2 wherein cobalt forms 6.2 to 6.4 w/o of said substrate.

4. The cutting insert according to claim 2 wherein the magnetic coercive force of said substrate is 120 to 160 oerstads.

5. The cutting insert according to claim 4 wherein cobalt forms 6.2 to 6.4 w/o of said substrate.

6. The cutting insert according to claim 1 wherein the magnetic coercive force of said substrate is 120 to 160 oerstads.

7. The cutting insert according to claim 6 wherein cobalt forms 6.2 to 6.4 w/o of said substrate.

8. The cutting insert according to claim 1 wherein cobalt forms 6.2 to 6.4 w/o of said substrate.

9. The cutting insert according to claim 1 wherein said backing layer includes a titanium carbide layer.

10. The cutting insert according to claim 1 wherein said backing layer consists of titanium carbonitride.

11. The cutting insert according to claim 1 wherein said intermediate sublayer includes a titanium nitride layer.

12. The cutting insert according to claim 1 wherein said finish layer includes a titanium carbonitride finish layer bonded to one of said alumina layers, and a titanium nitride finish layer bonded to said titanium carbonitride finish layer.

13. An indexable cutting insert comprising:
a body having a rake face and a flank face;
a cutting edge at a junction of said rake face and flank face;
said body composed of:
a cemented carbide substrate consisting essentially of tungsten carbide grains, tungsten solid solution carbide grains containing an element selected from the group of titanium, hafnium, zirconium, tantalum and niobium, alone or together, and 6.1 to 6.5 w/o cobalt;

said substrate having a hardness of 90.8 to 91.6 Rockwell A and a magnetic coercive force of 110 to 180 oerstads;

a coating bonded to said substrate;

said coating including a backing layer and active layer and a finish layer; said backing layer bonded to said substrate, containing a layer of titanium carbonitride and having a thickness of 5 to 8 $\mu$;

said active layer composed of a plurality of aluminum oxide sublayers bonded to each other by a titanium nitride intermediate layer; each of said alumina layers having a nominal thickness of less than about 1.5 $\mu$ and each of said titanium nitride layers having a nominal thickness of about 0.2 to 1.0 $\mu$;

said finish layer bonded to the last aluminum oxide sublayer in said active layer and having a thickness of about 0.2 to 4 $\mu$ of titanium nitride.

* * * * *

UNITED STATES PATENT AND TRADEMARK OFFICE
CERTIFICATE OF CORRECTION

PATENT NO. : 4,984,940
DATED : January 15, 1991
INVENTOR(S) : William A. Bryant; George P. Grab It is certified that error appears in the above—identified patent and that said Letters Patent is hereby corrected as shown below:

Title Page [75] Inventors: "William A. Bryant, Mc Keesport; George P. Grab, Greensburg, both of Pa." should read ---William A. Bryant, McKeesport; George P. Grab, Greensburg; Anakkavur T. Santhanam, Monroeville; Dennis T. Quinto, Greensburg; all of PA, and James L. Hunt of Raleigh, NC.---

Title Page Other Publications Column 2 "Dreyer et al., "Development and Tool Life Behavior of Super-Wear-Resistant Multilayer Coatings on Harometals,"" should read ---Dreyer et al., "Development and Tool Life Behavior of Super-Wear-Resistant Multilayer Coatings on Hardmetals,"---

Column 3, line 46, "5 hafnium," should read ---hafnium,---

Starting at Column 5, line 51, add the following:
---25 micron vacuum. The sintered product was then ground and honed to a SNGN-433 (ANSI B 212.4-1986) style indexable insert substrate.

TABLE 1

| Material | FSSS Apparent Powder Size (Microns) | TC | Weight % in Mix Co | Ta | Ti | Nb | Charge Weight (Grams) |
|---|---|---|---|---|---|---|---|
| WC | 4.05 | 4.82 | - | - | - | - | 7,762 |
| WTiC$_2$ | 1.00 | .92 | .03 | .22 | 2.00 | .04 | 922 |
| TaC | 1.65 | .22 | - | 3.28 | - | - | 350 |
| NbC | 1.45 | .19 | - | - | - | 1.46 | 165 |
| Co | 1.46 | - .03 | 6.27 | - | - | - | 631 |
| W | 1.34 | - | - | - | - | - | 170 |
| Total | | 6.12 | 6.30 | 3.50 | 2.00 | 1.50 | 10,000 |

Examination of the sintered product (batch 1) showed that it had a magnetic saturation of 98 percent, a magnetic coercive force of 150 oerstads and a Rockwell A hardness of 91.4 - 91.5. The tungsten carbide grain size ranged from 1 to 7 microns with a few larger tungsten carbide grains up to 17 microns. The solid solution carbide grain size ranged

UNITED STATES PATENT AND TRADEMARK OFFICE
CERTIFICATE OF CORRECTION

PATENT NO. : 4,984,940
DATED : January 15, 1991
INVENTOR(S) : William A. Bryant; George P. Grab It is certified that error appears in the above—identified patent and that said Letters Patent is hereby corrected as shown below:

from 1 to 4 microns (see Figure 2). The porosity of the substrate was rated as A02 - B00.1 - C00. No cobalt enrichment or solid solution carbide depletion was observed at or near the substrate surface.

Two additional batches (batches 2 and 3) of substrates were made having the same nominal composition as that described above and processed in a manner similar to that described above. These two batches were, however, pressure sintered by sintering for 30 minutes at 2650°F in vacuum followed by 30 minutes pressurization at temperature and then further sintering at 2650°F for 30 minutes at 300 psi argon.

Batch 2 sintered product had a magnetic saturation of 96 percent of saturation, a magnetic coercive force of 130 oerstads and a Rockwell A hardness of 91.2. The tungsten carbide grain size ranged from about 1 to 7 microns. The solid solution carbide grain size ranged from about 1 to 4 microns. The porosity of the substrate was A02 - B00-2 - C00. Cobalt enrichment and solid solution carbide depletion were observed extending inwardly about 14 and 19.1 microns, respectively, in from the substrate surface.

Batch 3 sintered substrates had a magnetic saturation of 91 percent of saturation, a magnetic coercive force of 138 oerstads and a Rockwell A hardness of 91.4. The microstructure was similar to the Batch 1 microstructure (i.e., no cobalt enrichment or solid solution carbide depletion observed at the substrate surface).

The substrates from batches 2 and 3 were cleaned and then coated in a production size CVD reactor to provide one of the two nominal coating structures outlined below:

UNITED STATES PATENT AND TRADEMARK OFFICE
CERTIFICATE OF CORRECTION

PATENT NO. : 4,984,940
DATED : January 15, 1991
INVENTOR(S) : William A. Bryant; George P. Grab It is certified that error appears in the above—identified patent and that said Letters Patent is hereby corrected as shown below:

|  | Coating 1 | | Coating 2 | |
|---|---|---|---|---|
| Backing Layer: | 5.5μ | TiCN | 6.0μ | TiCN |
|  | 0.5μ | TiCN graded to TiN | | |
| Active Layer: | 1.0μ | $Al_2O_3$ | 1.0μ | $Al_2O_3$ |
|  | 0.5μ | TiN | 0.5μ | TiN |
|  | 1.0μ | $Al_2O_3$ | 1.0μ | $Al_2O_3$ |
|  | 0.5μ | TiN | 0.5μ | TiN |
|  | 1.0μ | $Al_2O_3$ | 1.0μ | $Al_2O_3$ |
| Finish Layer: | 0.3μ | TiCN | 0.3μ | TiCN |
|  | 0.7μ | TiN | 0.7μ | TiN |
| Total Nominal Coating Thickness | 11.0μ | | 11.0μ | |

The coatings 1 and 2 were respectively applied by the methods 1 and 2 shown in Table 2.

UNITED STATES PATENT AND TRADEMARK OFFICE
CERTIFICATE OF CORRECTION

PATENT NO. : 4,984,940

DATED : January 15, 1991

INVENTOR(S) : William A. Bryant; George P. Grab

It is certified that error appears in the above—identified patent and that said Letters Patent is hereby corrected as shown below:

TABLE 2
DEPOSITION CONDITIONS 1

Backing Layer
$H_2$ - 67, 79, 85, 67 SLPM          Time - 145, 15, 15, 15, min
$N_2$ - 20 SLPM                       Temperature - 920/960°C
$CH_4$ - 24, 12, 6, 0 SLPM            Pressure - 120 torr
$TiCl_4$ - 6.5 g/min

Active Layer
$Al_2O_3$:
$H_2$ - 51 SLPM                       Time - 115 minutes
$HCl$ - 2.4 SLPM                      Temperature - 920/940°C
$CO_2$ - 1.2 SLPM                     Pressure - 40 torr
$H_2S$ - 0.022 SLPM TiN:
$H_2$ - 30 SLPM                       Time - 15, 15 minutes
$N_2$ - 37 SLPM                       Temperature - 920/940°C
$TiCL_4$ - 6.5 g/min                  Pressure - 60, 120 torr

Finish Layer
TiCN:
$H_2$ - 85 SLPM                       Time - 7 minutes
$N_2$ - 31 SLPM                       Temperature - 970/1030°C
$CH_4$ - 20 SLPM                      Pressure - 120 torr
$TiCl_4$ - 7.6 g/min TiN:
$H_2$ - 85 SLPM                       Time - 15 minutes
$N_2$ - 31 SLPM                       Temperature - 970/1030°C
$TiCl_4$ - 7.6 g/min                  Pressure - 120 torr

*SLPM = standard liters/minute

UNITED STATES PATENT AND TRADEMARK OFFICE
CERTIFICATE OF CORRECTION

PATENT NO. : 4,984,940
DATED : January 15, 1991
INVENTOR(S) : William A. Bryant; George P. Grab It is certified that error appears in the above—identified patent and that said Letters Patent is hereby corrected as shown below:

TABLE 2
DEPOSITION CONDITIONS 2

Backing Layer

$H_2$ - 67 SLPM          Time - 200 minutes
$N_2$ - 20 SLPM          Temperature - 920/960°C
$CH_4$ - 24 SLPM         Pressure - 120 torr
$TiCl_4$ - 6.5 g/min

Active Layer

$Al_2O_3$:  $H_2$ - 44 SLPM       Time - 200 minutes
            $HCl$ - 2.4 SLPM      Temperature - 920/960°C
            $CO_2$ - 4.4 SLPM     Pressure - 40 torr
            $H_2S$ - 0

TiN:        $H_2$ - 30 SLPM       Time - 30 minutes
            $N_2$ - 37 SLPM       Temperature - 920/960°C
            $TiCL_4$ - 6.5 g/min  Pressure - 60 torr

Finish Layer

TiCN:       $H_2$ - 85 SLPM       Time - 7 minutes
            $N_2$ - 31 SLPM       Temperature - 970/1030°C
            $CH_4$ - 20 SLPM      Pressure - 120 torr
            $TiCl_4$ - 7.6 g/min TiN:        $H_2$ - 85 SLPM       Time - 15 minutes
            $N_2$ - 31 SLPM       Temperature - 970/1030°C
            $TiCl_4$ - 7.6 g/min  Pressure - 120 torr The nominal coating thicknesses reported above were measured on the rake face, approximately 0.1 inches away from the cutting edge nose, to avoid edge effects. Actual coating thicknesses measured (SNMG-433) on the type 2 coating on batches 2 and 3 as shown below:

UNITED STATES PATENT AND TRADEMARK OFFICE
CERTIFICATE OF CORRECTION

PATENT NO. : 4,984,940
DATED : January 15, 1991
INVENTOR(S) : William A. Bryant; George P. Grab It is certified that error appears in the above—identified patent and that said Letters Patent is hereby corrected as shown below:

|  | Batch 2/Coating 2($\mu$) | Batch 3/Coating 2($\mu$) |
| --- | --- | --- |
| TiCN | 6.5 | 6.8 |
| $Al_2O_3$ | 1.0 | 1.0 |
| TiN | 0.3 | 0.3 |
| $Al_2O_3$ | 0.8 | 0.8 |
| TiN | 0.4 | 0.3 |
| $Al_2O_3$ | 0.7 | 0.5 |
| TiCN | 0.3 | 0.3 |
| TiN | 0.6 | 0.9 |

Metalcutting tests using these inserts and inserts in other common geometry styles made in essentially the manner described above have provided excellent cutting performance in the turning of a variety of steels and good cutting performance in the turning of both gray and ductile cast irons. Inserts in accordance with the present invention have also exhibited excellent edge strength in interrupted cutting tests on steel and cast iron.

Inserts made essentially in accordance with the above procedures were made in the SNMG-433 geometry style (.002 to .004 inch radius hone) and subjected to the slotted bar edge strength tests described below in Table 3. The slotted bar utilized had four slots at 90° to each other running the length of the bar. The width of each slot was 3/16 inch.

UNITED STATES PATENT AND TRADEMARK OFFICE
CERTIFICATE OF CORRECTION

PATENT NO. : 4,984,940

DATED : January 15, 1991

INVENTOR(S) : William A. Bryant; George P. Grab

It is certified that error appears in the above—identified patent and that said Letters Patent is hereby corrected as shown below:

TABLE 3

SLOTTED BAR EDGE STRENGTH TEST--AISI 41L50 STEEL

| | Number of Impacts at 350 Surface Ft./Min. | | | |
|---|---|---|---|---|
| | Batch 2 Coating 1 | Batch 3 Coating 1 | Batch 2 Coating 2 | Batch 3 Coating 2 |
| Average* | 597+ | 310 | 409+ | 387 |
| Standard Deviation | 226 | 274 | 351 | 212 |

| | Number of Impacts at 650 Surface Ft./Min. | | | |
|---|---|---|---|---|
| | Batch 2 Coating 1 | Batch 3 Coating 1 | Batch 2 Coating 2 | Batch 3 Coating 2 |
| Average* | 502 | 421 | 636 | 577 |
| Standard Deviation | 152 | 159 | 77 | 147 |

Test Conditions

15° lead angle/cutting diameter
4.50 inch to 3.50 inch (for 350 sfm) and 5.78 inch to 4.58 inch (for 650 sfm)/
Feed rates: 0.0145, 0.020, .024, .029, .036, .040, .046, .053 inch - 100 impacts at each feed until breakage/0.100 inch depth of cut / no coolant

*Each average is an average of 7 to 8 cutting edge tests. The plus sign indicates that at least one edge underwent 800 impacts without failure, at which time the test was stopped.

UNITED STATES PATENT AND TRADEMARK OFFICE
CERTIFICATE OF CORRECTION

PATENT NO. : 4,984,940  Page 8 of 8

DATED : January 15, 1991

INVENTOR(S) : William A. Bryant, et al.

It is certified that error appears in the above-identified patent and that said Letters Patent is hereby corrected as shown below:

In a manner similar to the above, additional cutting inserts were made having the batch 1 substrate but with the following nominal coating structures:---

Signed and Sealed this

Twenty-first Day of July, 1992

Attest:

DOUGLAS B. COMER

Attesting Officer  Acting Commissioner of Patents and Trademarks